United States Patent
Sugiura

(10) Patent No.: US 11,430,986 B2
(45) Date of Patent: Aug. 30, 2022

(54) POSITIVE ELECTRODE ACTIVE MATERIAL HAVING HIGH DEGREE OF MATCHING OF ELECTROCONDUCTIVE DIRECTION AND LITHIUM ION SECONDARY CELL USING SAME

(71) Applicant: TOYOTA JIDOSHA KABUSHIKI KAISHA, Toyota (JP)

(72) Inventor: Ryuta Sugiura, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 16/666,701

(22) Filed: Oct. 29, 2019

(65) Prior Publication Data

US 2020/0067084 A1    Feb. 27, 2020

Related U.S. Application Data

(63) Continuation of application No. 15/363,677, filed on Nov. 29, 2016, now abandoned.

(30) Foreign Application Priority Data

Nov. 30, 2015   (JP) .................................. 2015-234084

(51) Int. Cl.
*H01M 4/36*       (2006.01)
*H01M 10/0525*    (2010.01)
(Continued)

(52) U.S. Cl.
CPC .......... *H01M 4/366* (2013.01); *H01M 4/485* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 5,773,168 A    6/1998   Kubo et al.
6,964,828 B2   11/2005  Lu et al.
(Continued)

FOREIGN PATENT DOCUMENTS

CN    103413924 A  *  11/2013
CN    103413924 A     11/2013
(Continued)

OTHER PUBLICATIONS

Lin et al., Journal of Power Sources, 2014, 259, 188-194. (Year: 2014).*
Yang et al., J. Mater. Chem. A, 2013, 1, 13742-13745. (Year: 2013).*
(Continued)

*Primary Examiner* — Zhongqing Wei
(74) *Attorney, Agent, or Firm* — Sughrue Mion, PLLC

(57) ABSTRACT

The positive electrode active material disclosed herein includes a base portion including a lithium transition metal complex oxide having a layered crystal structure, and a coating portion including an electroconductive oxide having a layered crystal structure. A smaller angle θ formed by a stacking plane direction of the lithium transition metal complex oxide and a stacking plane direction of the electroconductive oxide satisfies the following conditions: an average angle θave. obtained by arithmetically averaging the angle θ satisfies 0°≤θave.≤60°; and a ratio of points in which the angle θ is greater than 60° is 39% or less.

8 Claims, 4 Drawing Sheets

(51) Int. Cl.
    *H01M 4/525*   (2010.01)
    *H01M 4/505*   (2010.01)
    *H01M 4/485*   (2010.01)
    *H01M 4/62*    (2006.01)
    *H01M 4/02*    (2006.01)

(52) U.S. Cl.
    CPC ......... *H01M 4/62* (2013.01); *H01M 10/0525* (2013.01); *H01M 2004/028* (2013.01); *H01M 2220/20* (2013.01)

(56) References Cited

U.S. PATENT DOCUMENTS

| | | |
|---|---|---|
| 2014/0227584 A1 | 8/2014 | Holstein et al. |
| 2015/0132652 A1* | 5/2015 | Ito .......................... H01B 1/08 |
| | | 429/223 |
| 2017/0155135 A1 | 6/2017 | Sugiura |

FOREIGN PATENT DOCUMENTS

| | | |
|---|---|---|
| JP | 09120815 A | 5/1997 |
| JP | 2000-235858 A | 8/2000 |
| JP | 2001-266879 A | 9/2001 |

OTHER PUBLICATIONS

Kakihana et al., J. Appl. Phys., 1991, 69(2), 867-873. (Year: 1991).*

Yingbin Lin et al., "Enhanced electrochemical performances of $LiNi_{0.5}Mn_{1.5}O_4$ by surface modification with superconducting $YBa_2Cu_3O_7$", Journal of Power Sources, 2014, pp. 188-194, vol. 259.

* cited by examiner

POSITIVE ELECTRODE ACTIVE MATERIAL HAVING HIGH DEGREE OF MATCHING OF ELECTROCONDUCTIVE DIRECTION AND LITHIUM ION SECONDARY CELL USING SAME

CROSS-REFERENCE TO RELATED APPLICATION

The present application is a continuation of application Ser. No. 15/363,677, filed on Nov. 29, 2016, which claims priority to Japanese Patent Application No. 2015-234084, filed on Nov. 30, 2015, the contents of each of which are hereby incorporated by reference in the present description in their entirety.

BACKGROUND OF THE INVENTION

Field of the Invention

The present invention relates to a positive electrode active material and a lithium ion secondary cell using the same.

Description of the Related Art

Further increase in energy density and durability of lithium ion secondary cells has been investigated as a means for improving the cell performance. The techniques relating thereto are disclosed in Japanese Patent Application Publication No. 2001-266879, Japanese Patent Application Publication No. 2000-235858, and Journal of Power Sources, Vol. 259, pp. 188-194, 2014. For example, Japanese Patent Application Publication No. 2001-266879 indicates that thermal stability of a cell in a charged state can be improved by coating the surface of positive electrode active material particles (base active material) with a layered electroconductive oxide.

SUMMARY OF THE INVENTION

However, it was found that when the abovementioned techniques are used in cells (for example, cells for vehicles) required to have both a high input-output characteristic and a high durability, there is still room for improvement. Specifically, the electroconductive oxide such as disclosed in Japanese Patent Application Publication No. 2001-266879 generally has a large anisotropy of electroconductivity. The investigation conducted by the inventors has revealed that when a material (for example, a layered compound) with a large anisotropy of electroconductivity is used as a base active material, where the electroconductive direction of the base active material is not matched with the electroconductive direction of the electroconductive oxide, the cell resistance is greatly increased. Another drawback is that the electroconductive oxide peels off from the surface of the base active material and durability decreases as a result of the base active material expansion and contraction when the cell is charged and discharged.

The present invention has been created to resolve such problems, and it is an object of the present invention to provide a positive electrode active material in which the effect of coating the surface of a base active material with an electroconductive oxide is advantageously demonstrated. Another related object is to provide a lithium ion secondary cell that is provided with the positive electrode active material and excels in input-output characteristic and durability.

The present invention provides a positive electrode active material for a lithium ion secondary cell, including a base portion including a lithium transition metal complex oxide having a layered crystal structure, and a coating portion formed on a surface of the base portion, and including an electroconductive oxide having a layered crystal structure. In such a positive electrode active material, when electron microscope observations are performed 10 or more times such that the base portion and the coating portion are present in the same field of view, and electron beam diffraction images of the lithium transition metal complex oxide and of the electroconductive oxide are acquired in each observed point, where a stacking plane direction of the layered crystal structure in the lithium transition metal complex oxide is represented by a first virtual line and a stacking plane direction of the layered crystal structure in the electroconductive oxide is represented by a second virtual line, a smaller angle θ formed by the first virtual line and the second virtual line satisfies the following conditions: an average angle θave. obtained by arithmetically averaging the angle θ satisfies 0°≤θave.≤60°; and a ratio of points in which the angle θ is greater than 60° is 39% or less.

In such positive electrode active material, the effect of coating the surface of the base portion with the coating portion is demonstrated to a higher degree. In other words, compounds with a layered structure generally have a large anisotropy of electroconductivity, and the electroconductivity in the stacking plane direction (direction perpendicular to the stacking direction) tends to be high. Therefore by matching the stacking plane direction of the base portion with the stacking plane direction of the coating portion, it is possible to demonstrate the effect of improving the electroconductivity at a high level. Further, the coating portion easily relaxes stresses in the crystals in the stacking direction. Therefore, with the positive electrode active material of such a configuration, stresses are unlikely to be accumulated when the base portion expands and contracts in the stacking direction as the cell is charged and discharged, and as a result, the coating portion is unlikely to peel off from the base portion. As a result, the positive electrode active material makes it possible to realize a lithium ion secondary cell with excellent input-output characteristic and durability.

In the preferred embodiment of the positive electrode active material disclosed herein, the θave. satisfies 0°≤θave.≤23°. The degree of matching of the electroconductive direction of the base portion and the electroconductive direction of the coating portion can thus be further improved. As a result, the cell resistance can be further decreased and further improvement of the input-output characteristic can be realized.

In the preferred embodiment of the positive electrode active material disclosed herein, the ratio of points in which the angle θ is greater than 60° is 10% or less. The degree of matching of the electroconductive direction of the base portion and the electroconductive direction of the coating portion can thus be further improved. As a result, the cell resistance can be further decreased and further improvement of the input-output characteristic can be realized.

As another aspect of the present invention, there is provided a lithium ion secondary cell equipped with the positive electrode active material. Such a lithium ion secondary cell, for example, has a low initial resistance and a high durability such that the cell capacity is unlikely to decrease even in repeated charging and charging over a long period of time.

DESCRIPTION OF THE EMBODIMENTS

Figure 1:
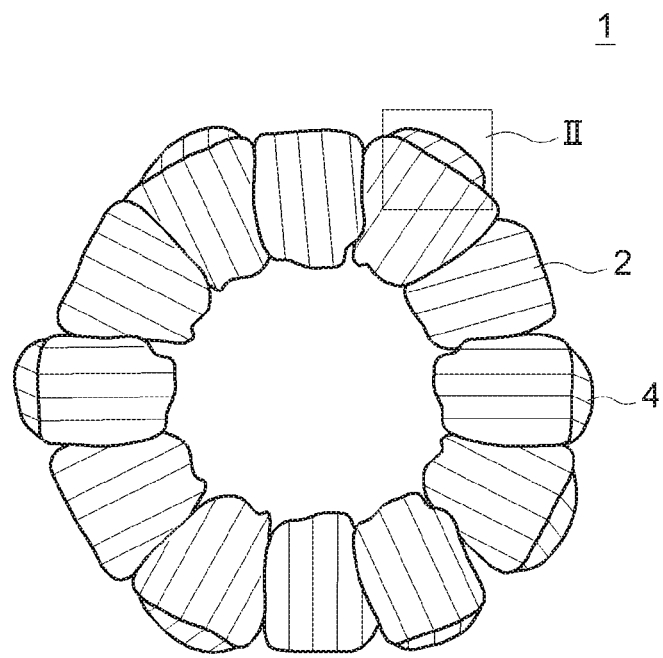
FIG. 1 is a schematic diagram illustrating the cross section of the positive electrode active material according to one embodiment.

The preferred embodiment of a positive electrode active material disclosed herein and a lithium ion secondary cell using the same will be explained herein with reference to appropriate drawings. Features other than those specifically described in the present specification (for example, the composition and shape of the positive electrode active material), but necessary for implementing the present invention (for example, constituent elements of the cell other than the positive electrode active material and general process for manufacturing the cell) can be considered as design matters for a person skilled in the art that are based on the conventional techniques in the pertinent field. The positive electrode active material disclosed herein and the lithium ion secondary cell using the same can be implemented on the basis of the contents disclosed in the present specification and common technical knowledge in the pertinent field. In the drawings described hereinbelow, members and parts demonstrating like action are assigned with like reference numerals and the redundant explanation thereof is herein omitted or simplified. The dimensional relationships (length, width, thickness, etc.) in the drawings do not necessarily reflect actual dimensional relationships.

[Positive Electrode Active Material]

Figure 2:
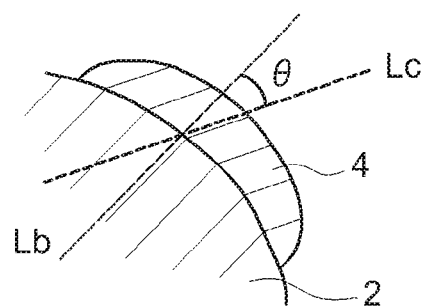
FIG. 2 is a partial enlarged view in (II) in FIG. 1.

A positive electrode active material 1 depicted in FIG. 1 will be explained hereinbelow by way of example, but this example is not intended to be particularly limiting. FIG. 1 is a schematic diagram illustrating the cross section of the positive electrode active material 1 according to one embodiment. FIG. 2 is a partial enlarged view in which part of the surface of the positive electrode active material 1 is depicted on an enlarged scale. The particle of the positive electrode active material 1 depicted in FIG. 1 has a base portion 2 serving as a nucleus of the positive electrode active material 1 and a coating portion 4 that covers the surface of the base portion 2.

In the present embodiment, the base portion 2 is in the form of the so-called hollow structure. That is, the base portion 2 has a ring-shaped substantive portion formed by aggregation (association) of primary particles of a lithium transition metal complex oxide and a hollow portion (void portion) formed inside thereof. In the present embodiment, the base portion 2 has the hollow structure, but such the structure is not limiting. For example, the base portion 2 may have a common porous structure or solid structure in which the substantive portion and void portion are present homogeneously throughout the entire base portion 2.

The base portion 2 includes a lithium transition metal complex oxide having a layered crystal structure. In the present invention, the substantive portion is configured by aggregation of primary particles of the lithium transition metal complex oxide. The lithium transition metal complex oxide includes a lithium element and one or two or more transition metal elements. It is preferred that the lithium transition metal complex oxide include at least one of Ni, Co, and Mn as the transition metal element. Typical examples of the lithium transition metal complex oxide include a lithium-nickel complex oxide, a lithium-cobalt complex oxide, a lithium-nickel-manganese complex oxide, a lithium-nickel-cobalt-manganese complex oxide, a lithium-nickel-cobalt-aluminum complex oxide, and a lithium-iron-nickel-manganese complex oxide.

The "lithium-nickel-cobalt-manganese complex oxide", as referred to in the present specification, is a term inclusive not only of oxides having Li, Ni, Co, Mn, and O as constituent elements, but also of oxides including one or two or more other additional elements. Examples of such the additional elements include transition metal elements and typical metal elements such as Na, Mg, Ca, Ba, Y, Ti, Zr, Hf, V, Nb, Ta, Cr, Mo, W, Fe, Cu, Zn, Al, and Ga. The additional elements may be also semimetal elements such as B, C, Si, and P, and non-metal elements such as S, F, Cl, Br, and I. The same is true with respect to the abovementioned lithium-nickel complex oxide, lithium-cobalt complex oxide, lithium-nickel-manganese complex oxide, lithium-nickel-cobalt-aluminum complex oxide, lithium-iron-nickel-manganese complex oxide, and the like.

In the preferred embodiment, the lithium transition metal complex oxide is a lithium-nickel-cobalt-manganese complex oxide represented by the following formula (I).

$$Li_{1+x}Ni_yCo_zMn_{(1-y-z)}M_\alpha O_{2-\beta}A_\beta \qquad (I),$$

(Where $0 \leq x \leq 0.7$, $0.1 < y < 0.9$, $0.1 < z < 0.4$, $0 \leq \alpha \leq 0.1$, $0 \leq \beta \leq 0.5$, M and A may or may not be included. When $0 < \alpha$, M is one or two or more elements among Zr, Mo, W, Mg, Ca, Na, Fe, Cr, Zn, Si, Sn, Al, and B. When $0 < \beta$, A is one or two or more elements among F, Cl, and Br.)

In Formula (I), y, z, and (1-y-z) may be about the same (for example, the difference therebetween may be 0.1 or less). In other words, the composition ratio of Ni, Co, and Mn may be about the same. Such a lithium-nickel-cobalt-manganese complex oxide has a high energy density and also excels in thermal stability. For this reason, the effect of the technique disclosed herein can be demonstrated at a higher level.

The lithium transition metal complex oxide has a layered crystal structure. The crystal structure (whether it is layered) of the lithium transition metal complex oxide can be determined, for example, by well-known conventional X-ray diffraction measurements, or the like.

In the preferred embodiment, the lithium transition metal complex oxide has an X-ray diffraction peak attributable to a hexagonal crystal structure of a space group R3-m and/or a monoclinic crystal structure of a space group C2/m. In such crystal structures, smooth introduction and release of lithium ions are possible, but the anisotropy of electroconductivity tends to increase. Therefore, in the lithium transition metal complex oxide having such X-ray diffraction peaks, the effect of the technique disclosed herein can be demonstrated at a higher level.

Figure 3A:
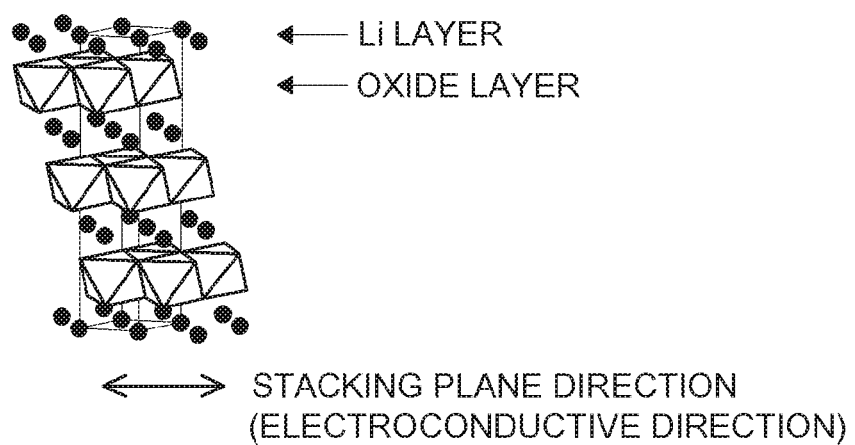
FIG. 3A is a schematic diagram illustrating the crystal structure of lithium-nickel-cobalt-manganese oxide.

An example of the crystal structure of the lithium transition metal complex oxide is depicted in FIG. 3A. FIG. 3A is a schematic diagram illustrating the crystal structure of the lithium-nickel-cobalt-manganese complex oxide. The lithium-nickel-cobalt-manganese complex oxide has a layered rock-salt structure in which oxide layers and lithium (Li) layers are stacked alternately in a predetermined stacking direction. The stacking direction of the lithium-nickel-cobalt-manganese complex oxide is the up-down direction in FIG. 3A. In the oxide layer, oxygen octahedral structures are contiguous in the stacking plane direction (direction perpendicular to the stacking direction; the left-right direction in FIG. 3A) and form a sheet-shaped configuration. The oxygen octahedral structure is formed by transition metals, namely, Ni, Co, and Mn, serving as central elements, and by six oxygen elements surrounding the periphery of the central elements. Meanwhile, in the lithium layer, lithium ions tend to move easily in the stacking plane direction. For this reason, in FIG. 3A, the stacking plane direction is an "electroconductive direction" with a high electroconductivity.

In FIGS. 1 and 2, the electroconductive direction of the base portion 2 is represented by straight lines. That is, in FIGS. 1 and 2, directions extending radially from the central side (side of the hollow portion) of the base portion 2 to the surface side (side of the coating portion 4) are electroconductive directions.

The size (average particle diameter) of the base portion 2 is not particularly limited, but may be about 0.1 μm or more, for example, 1 μm or more with consideration for handleability and operability during molding of the coating portion 4. Further, from the standpoint of forming a dense and homogeneous positive electrode active material layer, the size may be about 50 μm or less, typically 30 μm or less, for example, 20 μm or less. A particle diameter ($D_{50}$ particle diameter) corresponding to cumulative 50%, from the fine particle side with a small particle diameter, in a volume-standard particle size distribution obtained by particle size distribution measurements based on the general laser diffraction-light scattering method can be used as the average particle diameter.

The coating portion 4 includes an electroconductive oxide having a layered crystal structure. In the present specification, the term "electroconductive oxide" means an oxide having electroconductivity in a temperature range (for example, 0° C. to 50° C.) in which the cell is used. Among them, oxides which are generally known as superconductive materials are preferred. Typical examples of electroconductive oxides include perovskite-type electroconductive oxides, pyrochlore-type electroconductive oxides, and $K_2NiF_4$-type electroconductive oxides. Specific examples include $YBa_2Cu_3O_7$ (YBCO), $Bi_2Sr_2Ca_2Cu_3O_{10}$, $Hg_{12}Tl_3Ba_{30}Ca_{30}Cu_{45}O_{127}$, $La_{2-x}Sr_xCuO_4$ (LSCO, where 0<x<2), LaFePO, LaFeAsO, and $LaFeAsO_{1-x}F_x$ (where 0<x<1).

In the chemical formulas, the composition ratio of oxygen (O) is represented by integers for the sake of convenience, but these numerical values need not to be interpreted strictly, and fluctuations (for example, fluctuations of about ±20%) thereof associated with stability of crystal structure, or the like, can be allowed.

The electroconductive oxide has a layered crystal structure. The crystal structure (whether it is layered) of the electroconductive oxide can be determined, for example, by well-known conventional X-ray diffraction measurements, or the like.

In the preferred embodiment, the electroconductive oxide has a two-dimensional plane (electroconductive surface) responsible for electron conduction in the crystal structure. For example, a $CuO_2$ plane and FeAs plane are known as electroconductive surfaces.

Figure 3B:
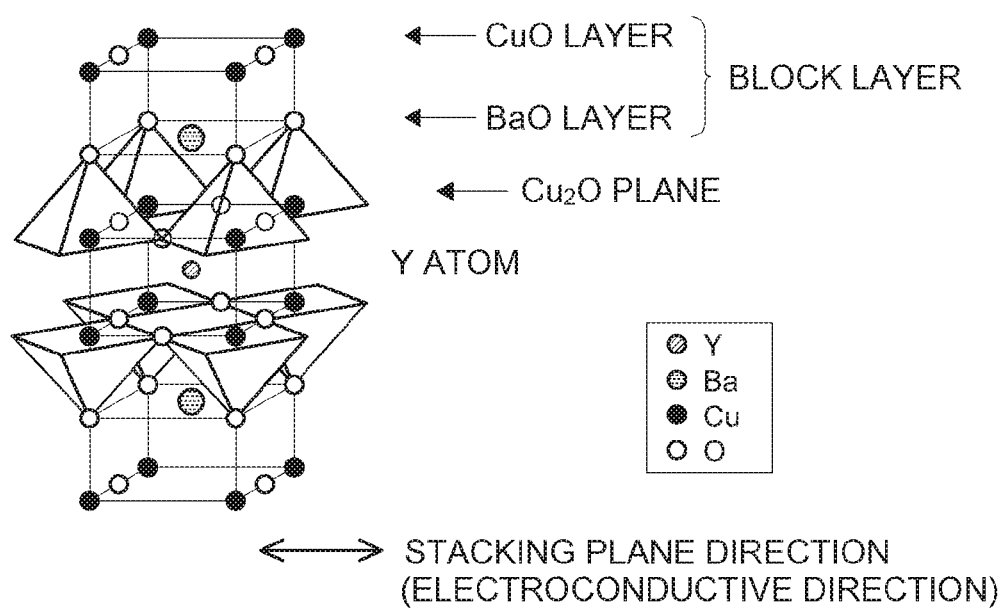
FIG. 3B is a schematic diagram illustrating the crystal structure of yttrium-barium-copper oxide.

An example of the crystal structure of an electroconductive oxide is depicted in FIG. 3B. FIG. 3B is a schematic diagram of the crystal structure of yttrium-barium-copper oxide ($YBa_2Cu_3O_7$). This oxide has a layered structure in which an insulating layer, which is called "block layer", and a $CuO_2$ plane are stacked in a predetermined stacking direction (up-down direction in FIG. 3B). In the block layer, a CuO layer and a BaO layer are stacked in the stacking direction. In the $CuO_2$ plane, Cu and O are arranged in a square lattice shape and have a sheet-shaped form in a stacking plane direction (left-right direction in FIG. 3B) perpendicular to the stacking direction. In the $CuO_2$ plane, electrons move easily in the stacking plane direction. Therefore, in FIG. 3B, the stacking plane direction is an "electroconductive direction" with a high electroconductivity. Yttrium (Y) atoms are disposed in a space sandwiched between two $CuO_2$ planes.

In FIGS. 1 and 2, the electroconductive directions in the coating portion 4 are represented by straight lines.

In the positive electrode active material 1 of the present embodiment, the electroconductive direction of the lithium transition metal complex oxide in the base portion 2 and the electroconductive direction of the electroconductive oxide in the coating portion 4 are advantageously matched. This will be described in greater detail with reference to FIG. 2.

As depicted in FIG. 2, an interface of the base portion 2 and the coating portion 4 is at the surface of the positive electrode active material 1. The base portion 2 and the coating portion 4 each have an oxide (layered oxide) of a layered structure. In FIG. 2, the stacking plane directions of the layered oxides are represented by lines.

Where the stacking plane direction of the layered oxide in the base portion 2 is taken as a first virtual line Lb and a stacking plane direction of the layered oxide in the coating portion 4 is represented by a second virtual line Lc, the first virtual line Lb and the second virtual line Lc intersect at the interface of the base portion 2 and the coating portion 4. In this case, the smaller of the angles formed by the two straight lines is denoted by θ. The angle θ is 0° at a minimum and 90° at a maximum. The stacking plane directions of the base portion 2 and the coating portion 4 can be said to coincide at a higher level as the angle θ becomes smaller.

In the present embodiment, when the angle θ is measured at the surface of the positive electrode active material 1, the following conditions are satisfied: an average angle θave. obtained by arithmetically averaging the angle θ in all measurement points satisfies 0°≤θave.≤60°; and the ratio of points in which the angle θ is greater than 60° is 39% or less of all measurement points. As a result, a high electroconductivity can be realized in the positive electrode active material 1. Further, since stresses generated as the base portion 2 expands and contracts are unlikely to be accumulated in the base portion 2, peeling of the coating portion 4 can be suppressed.

The average angle θave. is preferably 40° or less, more preferably 31° or less, and even more preferably 23° or less. As a result, the effects of the technique disclosed herein can be stably demonstrated at an even higher level. Meanwhile, the time required for producing the positive electrode active material 1 with a smaller average angle θave. tends to increase. Therefore, from the standpoint of productivity and cost, the average angle θave. may be 5° or more, for example, 12° or more. Likewise, the ratio of points in which the angle θ is greater than 60° is preferably 22% or less, more preferably 16% or less, in particular 10% or less. Further, the ratio of points in which the angle θ is greater than 60° may be, for example, 7% or more.

The angle θ can be measured, for example, in the following manner. First, the cross section of the positive electrode active material 1 is sliced by focused ion beam (FIB) processing or the like. Then, electron microscope observations of the positive electrode active material 1 are performed 10 or more times so that the base portion 2 and the coating portion 4 are present in the same field of view. For example, a transmission electron microscope (TEM) can be used as the electron microscope. Then, electron beam diffraction measurements are performed separately for the base portion 2 and the coating portion 4 in the same field of view, and electron beam diffraction images are acquired. The crystal orientation of the layered oxide in the base portion 2 and the crystal orientation of the layered oxide in the coating portion 4 are then analyzed from the obtained electron beam diffraction images, and the respective stacking plane directions are determined. A smaller angle among the angles formed by the two stacking plane directions which are thus determined can be taken as the angle θ.

The ratio of the surface of the base portion 2 coated by the coating portion 4 (coverage ratio) is not particularly limited. From the standpoint of exhibiting the effect of improving the electroconductivity at a high level, about 10% or more, typically 20% or more, for example, 30% or more of the entire surface of the base portion 2 may be coated with the coating portion 4. Meanwhile, from the standpoint of maintaining and increasing the easiness of Li ion introduction and release, about 90% or less, for example, 80% or less of the entire surface of the base portion 2 may be coated with the coating portion 4. The coverage ratio of the surface of the base portion 2 can be determined, for example, by calculating the ratio (%) of the outer peripheral length of the base portion 2 where the coating portion 4 has been formed in the electron microscope observation image of the cross section of the positive electrode active material 1, the entire outer peripheral length of the base portion 2 being taken as 100%.

The average thickness of the coating portion 4 is not particularly limited, but from the standpoint of productivity, or the like, the average thickness may be about 100 nm or less, typically 0.5 nm to 20 nm, for example, about 1 nm to 5 nm. The average thickness of the coating portion 4 can be determined by measuring the shortest distance from any position on the inner surface of the coating portion 4 to the outer surface of the coating portion 4 in the electron microscope observation image of the cross section of the positive electrode active material 1.

The average particle diameter (secondary particle diameter) of the positive electrode active material 1 is not particularly limited, but with consideration for handleability and operability, the average particle diameter may be about 0.1 μm or more, for example, 1 μm or more. From the standpoint of forming a dense and homogeneous positive electrode active material layer, the average particle diameter may be about 50 μm or less, typically 30 μm or less, for example 20 μm or less.

The shape of the positive electrode active material 1 is not particularly limited. In a preferred example, the shape is substantially spherical. The term "substantially spherical" used herein is inclusive of spherical, rugby ball, and polygonal shapes, and the average aspect ratio (the ratio of the length in the long-axis direction to the length in the short-axis direction in the smallest rectangle circumscribing the particle) is about 1 to 2, for example, 1 to 1.5.

[Method for Manufacturing Positive Electrode Active Material]

A method for manufacturing the positive electrode active material 1 is not particularly limited. For example, a liquid-phase method such as a sol-gel method and a co-precipitation method can be used. An example of the preferred manufacturing method includes a step of preparing a lithium transition metal complex oxide as the base portion 2 and a step of forming the coating portion 4 by applying an electroconductive oxide to the surface of the prepared lithium transition metal complex oxide.

(Preparation of Lithium Transition Metal Complex Oxide)

In the present step, first, a supply source of a metal element, other than Li, that constitutes the lithium transition metal complex oxide is prepared. For example, a metal salt such as a nickel salt, a cobalt salt, and a manganese salt can be used as a supply source of a metal element other than Li. The anions of these metal salts may be selected to obtain the desired solubility of respective salts in water. For example, the anions of the metal salts can be a sulfate ion, a nitrate ion, and a carbonate ion. The supply source of the metal element is then weighed to obtain the desired composition ratio and mixed with a water-based solvent to prepare an aqueous solution.

Then, a basic aqueous solution with pH 11 to 14 is added to neutralize the aqueous solution, a hydroxide including the metal element is precipitated, and a sol-like starting material hydroxide is obtained. For example, an aqueous solution of sodium hydroxide or ammonia water can be used as the basic aqueous solution. In this case, the starting material hydroxide is precipitated slowly over time by stepwise adjusting the pH and amount added of the basic aqueous solution. As a result, a lithium transition metal complex oxide with adjusted crystal structure and crystal orientation, for example such as depicted in FIG. 1, can be advantageously realized.

This starting material hydroxide is then mixed with a lithium supply source, and the mixture is calcined and then cooled. For example, lithium carbonate, lithium hydroxide, and lithium nitrate can be used as the lithium supply source. The obtained calcined material is pulverized, as appropriate, to prepare a lithium transition metal complex oxide serving as the base portion 2.

(Application of Electroconductive Oxide)

In the present step, first, the supply source of the metal element constituting the electroconductive oxide is prepared. The supply source of the metal element is then weighed to obtain the desired composition ratio and mixed with a water-based solvent to prepare an aqueous solution. The aqueous solution is then mixed with the prepared lithium transition metal complex oxide at a desirable ratio and the solvent is then removed by drying. The powder obtained is calcined. As a result, the electroconductive oxide is directly fused to the surface of the lithium transition metal complex oxide, and the positive electrode active material 1 in the form in which the base portion 2 and the coating portion 4 are strongly combined together can be manufactured.

Where the predetermined calcination temperature is reached in the calcination, crystals of the electroconductive oxide start growing on the surface of the lithium transition metal complex oxide. In this case, in the temperature range in which the crystal growth advances, the temperature increase rate is deliberately adjusted to a lower rate so that crystal growth proceeds gradually over time. As a result, crystals of the electroconductive oxide can be epitaxially grown such as to inherit the crystal orientation of the lithium transition metal complex oxide. In one example, the temperature increase rate in a temperature range in which the epitaxial growth advances may be set to about 10° C./h to 100° C./h. As a result, the positive electrode active material 1 in which the electroconductive directions in the base portion 2 and the coating portion 4 are matched, for example such as depicted in FIG. 1, can be manufactured.

[Positive Electrode for Lithium Ion Secondary Cell]

The above-described positive electrode active material is used as a positive electrode for a lithium ion secondary cell. Such a positive electrode for the lithium ion secondary cell typically includes a positive electrode collector and a positive electrode active material layer including the positive electrode active material and formed on the positive electrode collector. An electroconductive material composed of a metal with good electric conductivity (for example, aluminum) can be advantageously used as the positive electrode collector. In addition to the positive electrode active material, the positive electrode active material layer can include other optional components such as an electroconductive material, a binder, and a dispersant. For example, a carbon material such as carbon black can be used as the electroconductive material. For example, a halogenated vinyl resin such as polyvinylidene fluoride (PVdF) can be used as the binder.

[Lithium Ion Secondary Cell]

A lithium ion secondary cell is constructed by accommodating the positive electrode together with a negative electrode and a nonaqueous electrolyte in a cell case.

The negative electrode typically includes a negative electrode collector and a negative electrode active material layer formed on the negative electrode collector. The negative electrode active material layer can include a negative electrode active material and other optional components (for example, a binder and a thickening agent). An electroconductive member composed of a metal with good electric conductivity (for example, copper) can be used as the negative electrode collector. For example, a carbon material such as graphite can be used as the negative electrode active material. For example, a styrene butadiene rubber (SBR) can be used as the binder. For example, carboxymethyl cellulose (CMC) can be used as the thickening agent.

An electrolyte (nonaqueous electrolytic solution) in which a support salt is included in a nonaqueous solvent is preferred as the nonaqueous electrolyte. For example, a lithium salt such as $LiPF_6$ and $LiBF_4$ can be used as the support salt. For example, an aprotic solvent such as a carbonate, an ester, and an ether can be used as the organic solvent.

Figure 4:
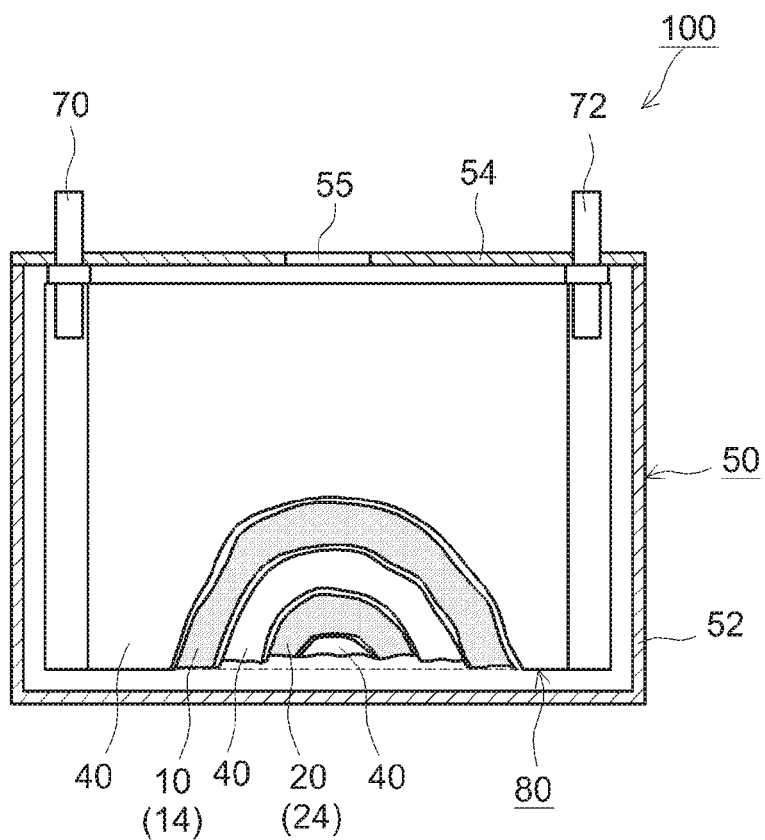
FIG. 4 is a schematic diagram illustrating the vertical sectional view of the lithium ion secondary cell according to one embodiment.

FIG. 4 is a schematic diagram illustrating the vertical sectional structure of the lithium ion secondary cell according to one embodiment. A lithium ion secondary cell 100 is provided with a flat wound electrode body 80, a nonaqueous electrolyte (not depicted in the figure), and a cell case 50 in the form of a flat rectangular parallelepiped in which the wound electrode body 80 and the nonaqueous electrolyte are accommodated.

The cell case 50 is provided with a case main body 52 in the form of a flat rectangular parallelepiped open at the upper end and a lid 54 that closes the opening of the case main body 52. The material of the cell case 50 is, for example, a lightweight metal such as aluminum. The shape of the cell case is not particularly limited and can be, for example, a rectangular parallelepiped or a cylinder. A positive electrode terminal 70 and a negative electrode terminal 72 for external connection are provided at the upper surface of the cell case 50 (that is, the lid 54). Parts of the terminals 70, 72 protrude to the surface side of the lid 54. The positive electrode terminal 70 is electrically connected to the positive electrode of the wound electrode body 80 on the cell case 50 side. The negative electrode terminal 72 is electrically connected to the negative electrode of the wound electrode body 80 on the cell case 50 side. The lid 54 is also provided with a safety valve 55 for releasing the gas generated inside the cell case 50 to the outside.

The wound electrode body 80 is provided with an elongated positive electrode sheet 10 and an elongated negative electrode sheet 20. The positive electrode sheet 10 is provided with an elongated positive electrode collector and a positive electrode active material layer 14 formed along the longitudinal direction on the surface (typically on both surfaces) of the positive electrode collector. The positive electrode active material layer 14 is provided with the above-described positive electrode active material 1. The negative electrode sheet 20 is provided with an elongated negative electrode collector and a negative electrode active material layer 24 formed along the longitudinal direction on the surface (typically on both surfaces) of the negative electrode collector. The wound electrode body 80 depicted in FIG. 4 is also provided with two elongated separator sheets 40. The positive electrode active material layer 14 of the positive electrode sheet 10 and the negative electrode active material layer 24 of the negative electrode sheet 20 are insulated from each other by the separator sheets 40. The material of the separator sheet 40 is, for example, a resin such as polyethylene (PE), polypropylene (PP), and polyesters. A porous heat-insulating layer including inorganic compound particles (inorganic filler) may be provided on the surface of the separator sheets 40 with the object of preventing a short circuit, and the like.

The wound electrode body 80 of the present embodiment has a flat shape, but a suitable shape (for example, a cylindrical shape or a stacked shape) can be selected, as appropriate, according to the shape of the cell case or usage objective.

[Application of Lithium Ion Secondary Cell]

The lithium ion secondary cell including the positive electrode active material disclosed herein is superior to the conventional products in both the input-output characteristic and the durability. Therefore, the lithium ion secondary cell is suitable for a variety of applications and can be advantageously used for applications requiring a high input-output density and applications requiring long-term continuous used without replacement. An example of such applications is a power source (drive power supply) for a motor installed on a vehicle. The type of the vehicle is not particularly limited, but the vehicle is typically an automobile, for example, a plug-in hybrid vehicle (PHV), a hybrid vehicle (HV), and an electric vehicle (EV). Such lithium ion secondary cells are typically used in the form of a cell pack in which a plurality of the cells are connected in series and/or parallel.

Several examples relating to the present invention will be explained hereinbelow, but the present invention is not intended to be limited to these examples.

I. Base Portion: $LiNi_{1/3}Co_{1/3}Mn_{1/3}O_2$; Coating portion: $YBa_2Cu_3O_{6.8}$ Example 1

Initially, nickel sulfate, cobalt sulfate, and manganese sulfate were dissolved as sources of metals other than Li in water so as to obtain the above composition of the base portion. Sodium hydroxide was added thereto and stirring was performed while neutralizing the system, to obtain the starting material hydroxide according to Example 1. The starting material hydroxide was mixed with lithium carbonate, and the mixture was calcined for 15 h at 900° C. under an air atmosphere. The calcined material was pulverized in a ball mill to obtain a lithium-nickel-cobalt-manganese complex oxide (LiNi$_{1/3}$Co$_{1/3}$Mn$_{1/3}$O$_2$) with an average particle diameter of 10 μm.

Then, yttrium sulfate, barium sulfate, and copper sulfate as metal sources were dissolved in water to obtain the composition of the coating portion. The obtained lithium-nickel-cobalt-manganese oxide was then added and the components were mixed. The amount added at this time was adjusted such that the total number of moles of the metals (Y, Ba, Cu) constituting the electroconductive oxide was 2 per 100 moles of all metals (Ni, Co, Mn), except for lithium, of the lithium-nickel-cobalt-manganese oxide. The mixture was then heated to 60° to remove the solvent, and a particulate powder was obtained in which the reaction precursor of the coating portion was attached to the surface of the lithium-nickel-cobalt-manganese complex oxide.

A positive electrode active material was then obtained by calcining the obtained particulate powder according to a predetermined calcination pattern. The calcination pattern was set to involve raising the temperature at a temperature increase rate of 200° C./h from room temperature to 300° C., raising the temperature at a temperature increase rate of 10° C./h from 300° C. to 450° C., raising the temperature at a temperature increase rate of 50° C./h from 450° C. to 550° C., and holding for 5 h after reaching 550° C.

Examples 2 to 8

In Examples 2 to 8, the positive electrode active materials were obtained in the same manner as in Example 1, except that the temperature increase rate from 300° C. to 450° C. was set to increase little by little within a range from 15° C./h to 100° C./h.

Reference Examples 1 to 4

In Reference Examples 1 to 4, the positive electrode active materials were obtained in the same manner as in Example 1, except that the temperature increase rate from 300° C. to 450° C. was set to increase little by little within a range from 100° C./h to 200° C./h.

Lithium ion secondary cells were constructed using the obtained positive electrode active materials (Examples 1 to 8 and Reference Examples 1 to 4).

More specifically, first, the fabricated positive electrode active material, polyvinylidene fluoride (PVdF) as a binder, acetylene black as an electroconductive materials, and a dispersant were weighed to obtain a mass ratio of 80:8:2:0.2. Then, a composition for forming a positive electrode active material layer was prepared by mixing these materials in N-methyl-2-pyrrolidone (NMP) to obtain a solid fraction of 56 mass %. A positive electrode sheet (Examples 1 to 8, Reference Examples 1 to 4) having a positive electrode active material layer on the positive electrode collector was fabricated by applying the composition to both surfaces of an aluminum foil (positive electrode collector) by using a die coater, drying, and then pressing.

Then, a graphite material as a negative electrode active material, a styrene-butadiene copolymer (SBR) as a binder, and carboxymethyl cellulose (CMC) as a thickening agent were weighed to obtain a mass ratio of 98:1:1. A composition for forming a negative electrode active material layer was then prepared by mixing these materials in water. A negative electrode sheet having a negative electrode active material layer on the negative electrode collector was fabricated by applying the composition to both surfaces of a copper foil (negative electrode collector), drying, and then pressing.

A wound electrode body was then fabricated by winding the positive electrode sheet and the negative electrode sheet together with a separator sheet. A porous resin sheet in which a polypropylene layer was laminated on both sides of a polyethylene layer was used as the separator sheet. Current-collecting members were welded to both end portions (non-formation portions of active material layers) in the lateral direction of the wound electrode body, and the wound electrode body was then accommodated in a cell case in the form of a rectangular parallelepiped.

Then, ethylene carbonate (EC), dimethyl carbonate (DMC), and ethyl methyl carbonate (EMC) were mixed at a volume ratio of 3:4:3 to prepare a mixed solvent. A non-aqueous electrolytic solution was prepared by dissolving LiPF$_6$ as a support salt at a concentration of 1.1 mol/L in the mixed solvent.

Lithium ion secondary cells (Examples 1 to 8, Reference Examples 1 to 4) were then constructed by pouring the nonaqueous electrolytic solution into the cell case and then sealing the cell case with the lid.

[Activation Treatment and Measurement of Initial Capacity]

The fabricated lithium ion secondary cells were constant-current (CC) charged at a rate of ⅓ C to a voltage of 4.2 V under a temperature environment of 25° C. and then constant-voltage (CV) charged to a current value of 1/50 C to obtain a fully charged state (state with a state of charge (SOC) of 100%). The cells were then constant-current (CC) discharged at a rate of ⅓ C to a voltage of 3 V under a temperature environment of 25° C., and the CC discharge capacity at this time was taken as the initial capacity. Here, 1 C means the current value at which the capacity (Ah) of the cell which is estimated from the theoretic capacity of the active material can be charged within 1 h.

[Measurement of Cell Resistance]

The open voltage of each lithium ion secondary cell was adjusted to 3.70 V. Each lithium ion secondary cell was CC discharged at a discharge rate of 10 C to a voltage of 3.00 V under a temperature environment of 25° C. A resistance value (5-sec value) was then calculated from the discharge current value and the terminal voltage value at a fifth second after the start of discharge. The results are shown in the appropriate column in Table 1. The values in Table 1 were obtained by normalization in which the resistance value for the lithium ion secondary cell of Example 1 was taken as a reference (100).

[High-Temperature Cycle Test]

Each lithium ion secondary cell was subjected to 200 cycles of repeated charging and discharging under a temperature condition of 60° C., and the cell capacity (CC discharge capacity) after each cycle was measured in the same manner as the initial capacity. The charging-discharging conditions of one cycle during the high-temperature cycle test were as follows: CC charging to a voltage of 4.3 V at a charge rate of 2 C and then CC discharging to a voltage of 3.0 V at a discharge rate of 2 C. The capacity retention ratio (%) was then calculated by dividing the cell capacity after 200 cycles by the initial capacity and multiplying by 100. The results are shown in the appropriate column in Table 1.

[Measurement of Angle θ in Positive Electrode Active Material]

Part of the positive electrode sheet was then cut out, the cross-section thereof was sliced by FIB, and the cross-section was observed under a TEM. Electron beam analysis and measurements were then performed at the base portion and coating portion in the field of view where the base portion and the coating portion formed an interface. In the base portion, the measurements were performed in a central part of a primary particle of the lithium transition metal complex oxide. As a result, the stacking plane direction of the layered oxide constituting each part was determined, and the angle θ was calculated from the relationship between these stacking plane directions. The measurements were performed in 10 or more observation points per 1 sample, and the average angle θave.)(° and the ratio (%) of the observation points in which the angle θ was greater than 60° (60°<θ) were determined. The results are shown in the appropriate column in Table 1.

are generally generated inside the positive electrode active material as a result of expansion and contraction of the base portion in the course of charging and discharging of the cell. In this case, where the crystal orientations of the base portion and coating portion are aligned, as in the technique disclosed herein, the generated stresses are unlikely to be accumulated in the base portion. As a result, the coating portion is unlikely to peel off from the base portion, and the effect of improving the electroconductivity is maintained for a long time.

Meanwhile, in Reference Examples 1 to 4 in which the abovementioned conditions were not satisfied, the resistance value during the high-rate discharge was relatively high, and/or the capacity retention ratio after the high-temperature cycle test was low. This was apparently because the epitaxial

TABLE 1

| | Base portion | Coating portion | Ratio (%) of 60° < θ | Average angle θave. (°) | Normalized resistance value | High-temperature cycle capacity retention ratio (%) |
|---|---|---|---|---|---|---|
| Example 1 | LiNi$_{1/3}$Co$_{1/3}$Mn$_{1/3}$O$_2$ | YBa$_2$Cu$_3$O$_{6.8}$ | 0 | 2 | 100 | 98 |
| Example 2 | ↑ | ↑ | 0 | 5 | 101 | 97 |
| Example 3 | ↑ | ↑ | 7 | 12 | 105 | 97 |
| Example 4 | ↑ | ↑ | 10 | 23 | 99 | 98 |
| Example 5 | ↑ | ↑ | 16 | 31 | 110 | 99 |
| Example 6 | ↑ | ↑ | 22 | 40 | 108 | 98 |
| Example 7 | ↑ | ↑ | 30 | 52 | 112 | 98 |
| Example 8 | ↑ | ↑ | 39 | 60 | 106 | 97 |
| Reference Example 1 | ↑ | ↑ | 60 | 65 | 160 | 93 |
| Reference Example 2 | ↑ | ↑ | 78 | 70 | 180 | 89 |
| Reference Example 3 | ↑ | ↑ | 87 | 80 | 185 | 89 |
| Reference Example 4 | ↑ | ↑ | 95 | 90 | 180 | 90 |

As shown in Table 1, in the test examples in which the temperature increase rate from 300° C. to 450° C. was set low during the calcination of the positive electrode active material, the average angle θave. was small and the ratio of points in which the angle θ was greater than 60° was also small. This is apparently because the epitaxial growth of the electroconductive oxide advanced advantageously due to a gradual increase of temperature in the calcination temperature region in which the crystal growth of the electroconductive oxide advanced.

Comparing the trend of the angle θ and the cell characteristics, in Examples 1 to 8 in which the following conditions were satisfied: the average angle θave. satisfied 0°≤θave.≤60°; and the ratio of points in which the angle θ was greater than 60° was 39% or less, the resistance value during the high-rate discharge was low and the capacity retention ratio after the high-temperature cycle test was high. In other words, in Examples 1 to 8, the output characteristic and high-temperature cycle characteristic were improved. This trend was particularly prominently demonstrated in Examples 1 to 4 in which the following conditions were satisfied: the average angle θave. satisfied 0°≤θave.≤23°; and/or the ratio of points in which the angle θ was greater than 60° was 10% or less.

The reason for this is apparently that the effect of improving the electroconductivity was enhanced and the cell resistance was reduced as a result of aligning the electron conduction orientation of the layered oxides, that is, as a result of orienting the lithium transition metal complex oxide of the base portion and the electroconductive oxide of the coating portion in the same direction. Further, stresses growth of the electroconductive oxide constituting the coating portion did not advance since the temperature increase rate in the temperature region from 300° C. to 450° C. was high during the calcination of the positive electrode active material. In other words, in Reference Examples 1 to 4, the effect of coating the lithium transition metal complex oxide with the electroconductive oxide could not be adequately demonstrated.

II. Examination of Electroconductive Oxide Contained in Coating Portion

Cells in which the type of the electroconductive oxide was changed were constructed and the evaluation thereof was performed in the same manner as described hereinabove. The test conditions are described hereinbelow. The results are shown in Table 2.

Examples 9 to 11

In Examples 9 to 11, the electroconductive oxides with the composition ratios shown in Table 2 were used for the coating portion. Specifically, the metal sources were dissolved in water so as to obtain the compositions shown in Table 2, and then the lithium-nickel-cobalt-manganese complex oxide was added and mixed. The temperature increase rate from 300° C. to 450° C. was set to 15° C./h. Positive electrode active materials were obtained in the same manner as in Example 1, except for the above-described changes.

Reference Examples 5 to 7

In Reference Examples 5 to 7, positive electrode active materials were obtained in the same manner as in Examples 9 to 11, except that the temperature increase rate from 300° C. to 450° C. was set to 120° C./h.

TABLE 2

| | Base portion | Coating portion | Ratio (%) of 60° < θ | Average angle θave. (°) | Normalized resistance value | High-temperature cycle capacity retention ratio (%) |
|---|---|---|---|---|---|---|
| Example 9 | $LiNi_{1/3}Co_{1/3}Mn_{1/3}O_2$ | $Bi_2Sr_2Ca_2Cu_3O_{9.8}$ | 10 | 10 | 111 | 98 |
| Reference Example 5 | ↑ | ↑ | 78 | 71 | 172 | 93 |
| Example 10 | ↑ | $La_{1.5}Sr_{0.5}CuO_4$ | 6 | 6 | 106 | 98 |
| Reference Example 6 | ↑ | ↑ | 80 | 73 | 190 | 94 |
| Example 11 | ↑ | $LaFeAsO_{0.9}$ | 15 | 12 | 130 | 97 |
| Reference Example 7 | ↑ | ↑ | 76 | 68 | 215 | 92 |

As shown in Table 2, even when the type of the electroconductive oxide contained in the coating portion was changed, the effect of improving the output characteristic and high-temperature cycle characteristic could be obtained as a result of the average angle θave. and the ratio of point in which the angle θ was greater than 60° satisfying the ranges of the abovementioned configurations.

III. Examination of Lithium Transition Metal Complex Oxide Contained in Base Portion Cells in which the type of the lithium transition metal complex oxide was changed were constructed and the evaluation thereof was performed in the same manner as described hereinabove. The test conditions are described hereinbelow. The results are shown in Table 3.

Examples 12 and 13

In Examples 12 and 13, the electroconductive oxides with the composition ratios shown in Table 3 were used for the base portion. Specifically, the metal sources other than Li were dissolved in water so as to obtain the compositions shown in Table 3, and then sodium hydroxide was added, and stirring was performed while neutralizing the system, to obtain starting material hydroxides. The temperature increase rate from 300° C. to 450° C. was set to 15° C./h. Positive electrode active materials were obtained in the same manner as in Example 1, except for the above-described changes.

Reference Examples 8 and 9

In Reference Examples 8 and 9, positive electrode active materials were obtained in the same manner as in Examples 12 and 13, except that the temperature increase rate from 300° C. to 450° C. was set to 120° C./h.

As shown in Table 3, even when the type of the lithium transition metal complex oxide contained in the base portion was changed, the effect of improving the output characteristic and high-temperature cycle characteristic could be obtained as a result of the average angle θave. and the ratio of point in which the angle θ was greater than 60° satisfying the ranges of the abovementioned configurations.

The present invention is explained hereinabove in detail, but the embodiments and examples hereinabove are merely exemplary, and the invention disclosed herein is inclusive of various changes and modifications of the specific examples.

The invention claimed is:

1. A method of producing a positive electrode active material for a lithium ion secondary cell, the method comprising the steps of:
   preparing a lithium transition metal complex oxide having a layered crystal structure as a base portion; and
   forming a coating portion by applying an electroconductive oxide to the surface of the prepared lithium transition metal complex oxide, wherein the electroconductive oxide is selected from the group consisting of $Bi_2Sr_2Ca_2Cu_3O_{10}$, $Hg_{12}Tl_3Ba_{30}Ca_{30}Cu_{45}O_{127}$, $La_{2-x}Sr_x CuO_4$ where 0<x<2, LaFePO, LaFeAsO, and $LaFeAsO_{1-x}F_x$ where 0<x<1;
   wherein the preparing step comprises:
   (1) supplying water-soluble metal salts used as sources of metal elements other than Li constituting the lithium transition metal complex oxide;
   (2) preparing an aqueous solution by mixing the water-soluble metal salts with an aqueous solvent;
   (3) precipitating a starting material hydroxide by stepwise adjusting the pH of the aqueous solution;
   (4) mixing the starting material hydroxide with a lithium supply source; and
   (5) calcining the mixture to prepare the lithium transition metal complex oxide.

TABLE 3

| | Base portion | Coating portion | Ratio (%) of 60° < θ | Average angle θave. (°) | Normalized resistance value | High-temperature cycle capacity retention ratio (%) |
|---|---|---|---|---|---|---|
| Example 12 | $LiCoO_2$ | $YBa_2Cu_3O_{6.8}$ | 11 | 9 | 95 | 96 |
| Reference Example 8 | ↑ | ↑ | 75 | 72 | 182 | 89 |
| Example 13 | $LiNi_{0.75}Co_{0.15}Al_{0.1}O_2$ | ↑ | 8 | 7 | 101 | 96 |
| Reference Example 9 | ↑ | ↑ | 80 | 75 | 170 | 87 |

2. The production method according to claim 1, wherein the stepwise adjustment of the pH of the aqueous solution is performed by stepwise adding a basic aqueous solution with a pH of from 11 to 14.

3. The production method according to claim 2, wherein the basic aqueous solution is an aqueous solution of sodium hydroxide or ammonia.

4. The production method according to claim 1, wherein the lithium supply source is lithium carbonate, lithium hydroxide or lithium nitrate.

5. The production method according to claim 1, wherein the lithium transition metal complex oxide is a lithium-nickel-cobalt-manganese complex oxide represented by the following formula (I):

$$Li_{1+x}Ni_yCo_zMn_{(1-y-z)}M_\alpha O_{2-\beta}A_\beta \quad (I),$$

wherein, in formula (I), $0 \leq x \leq 0.7$, $0.1 < y < 0.9$, $0.1 < z < 0.4$, $0 \leq \alpha \leq 0.1$, $0 \leq \beta \leq 0.5$, M and A may or may not be included, when $0 < \alpha$, M is one or two or more elements selected from the group consisting of Zr, Mo, W, Mg, Ca, Na, Fe, Cr, Zn, Si, Sn, Al, and B, and when $0 < \beta$, A is one or two or more elements selected from the group consisting of F, Cl, and Br.

6. The production method according to claim 1, wherein the forming step comprises:
(i) supplying one or more sources of a-metal element constituting the electroconductive oxide;
(ii) preparing an aqueous solution by mixing the one or more sources of the metal element with an aqueous solvent;
(iii) mixing the aqueous solution obtained in step (ii) with the prepared lithium transition metal complex oxide to obtain a mixture;
(iv) removing the aqueous solvent from the mixture obtained in step (iii) by drying the mixture; and
(v) calcining the mixture obtained in step (iv) to prepare the positive electrode active material in a form in which the base portion and the coating portion are combined together,
wherein the calcining in step (v) is performed according to a predetermined calcination pattern comprising raising the temperature from 300° C. to 450° C. at a temperature increase rate set to 10° C./h to 100° C./h.

7. The production method according to claim 6, wherein the temperature increase rate from 300° C. to 450° C. is set to 10° C./h or 15° C./h.

8. A method of producing a positive electrode active material for a lithium ion secondary cell, the method comprising the steps of:
preparing a lithium transition metal complex oxide having a layered crystal structure as a base portion; and
forming a coating portion by applying an electroconductive oxide to the surface of the prepared lithium transition metal complex oxide, wherein the electroconductive oxide is selected from the group consisting of $YBa_2Cu_3O_7$, $Bi_2Sr_2Ca_2Cu_3O_{10}$, $Hg_{12}Tl_3Ba_{30}Ca_{30}Cu_{45}O_{127}$, $La_{2-x}Sr_x CuO_4$ where $0 < x < 2$, $LaFePO$, $LaFeAsO$, and $LaFeAsO_{1-x}F_x$ where $0 < x < 1$;
wherein the preparing step comprises:
(1) supplying water-soluble metal salts used as sources of metal elements other than Li constituting the lithium transition metal complex oxide;
(2) preparing an aqueous solution by mixing the water-soluble metal salts with an aqueous solvent;
(3) precipitating a starting material hydroxide by stepwise adjusting the pH of the aqueous solution;
(4) mixing the starting material hydroxide with a lithium supply source; and
(5) calcining the mixture to prepare the lithium transition metal complex oxide,
wherein the forming step comprises:
(i) supplying one or more sources of metal element constituting the electroconductive oxide;
(ii) preparing an aqueous solution by mixing the one or more sources of metal element with an aqueous solvent;
(iii) mixing the aqueous solution obtained in step (ii) with the prepared lithium transition metal complex oxide to obtain a mixture;
(iv) removing the aqueous solvent from the mixture obtained in step (iii) by drying the mixture; and
(v) calcining the mixture obtained in step (iv) to prepare the positive electrode active material in a form in which the base portion and the coating portion are combined together,
wherein the calcining in step (v) of the forming step is performed according to a predetermined calcination pattern comprising raising the temperature from 300° C. to 450° C. at a temperature increase rate set to 10° C./h to 100° C./h.

* * * * *